United States Patent
Chiu et al.

(10) Patent No.: US 8,366,308 B2
(45) Date of Patent: Feb. 5, 2013

(54) BACKLIGHT MODULE

(75) Inventors: Kuan-Her Chiu, Taipei Hsien (TW); Irene Chen, Taipei Hsien (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 443 days.

(21) Appl. No.: 12/714,553

(22) Filed: Mar. 1, 2010

(65) Prior Publication Data

US 2010/0238684 A1  Sep. 23, 2010

(30) Foreign Application Priority Data

Mar. 19, 2009 (TW) .............................. 98108863 A

(51) Int. Cl.
  *F21V 7/04* (2006.01)
(52) U.S. Cl. ........ 362/621; 362/622; 362/612; 362/97.3
(58) Field of Classification Search .................. 362/621, 362/622, 608, 609, 97.1–97.4, 615, 612, 362/613, 606; 349/65; 385/129, 901
See application file for complete search history.

(56) References Cited

U.S. PATENT DOCUMENTS

| | | | |
|---|---|---|---|
| 7,448,786 B2 * | 11/2008 | Yue ................................ | 362/618 |
| 7,478,939 B2 * | 1/2009 | Lee et al. ...................... | 362/608 |
| 7,484,875 B2 * | 2/2009 | Kim et al. ..................... | 362/612 |
| 7,637,646 B2 | 12/2009 | Byun et al. | |
| 7,661,867 B2 * | 2/2010 | Egawa et al. ................ | 362/619 |
| 7,927,002 B2 * | 4/2011 | Lee et al. ...................... | 362/620 |
| 2007/0091640 A1* | 4/2007 | Kim et al. ..................... | 362/612 |
| 2007/0121342 A1* | 5/2007 | Tamura et al. ............... | 362/608 |
| 2007/0165419 A1 | 7/2007 | Horiuchi et al. | |
| 2007/0165423 A1* | 7/2007 | Choi et al. .................... | 362/621 |
| 2008/0137366 A1 | 6/2008 | Liu et al. | |
| 2008/0158477 A1 | 7/2008 | Hsiao | |
| 2009/0135627 A1* | 5/2009 | Furuyama et al. ........... | 362/621 |

FOREIGN PATENT DOCUMENTS

| | | |
|---|---|---|
| CN | 1922436 A | 2/2007 |
| CN | 101097349 A | 1/2008 |
| CN | 101196590 A | 6/2008 |

* cited by examiner

*Primary Examiner* — Bao Q Truong
(74) *Attorney, Agent, or Firm* — Altis Law Group, Inc.

(57) ABSTRACT

A backlight module includes a plurality of first light sources emitting first light and a light guide plate. The first light sources are arranged in a line and spaced from each other. Two adjacent first light sources define a first space therebetween. The light guide plate includes a first light incident surface and a light output surface. The first light incident surface has a plurality of bright areas respectively corresponding to the first light sources and a plurality of dark areas respectively corresponding to the first spaces. A plurality of first reflectors is disposed on the plurality of dark areas of the first incident surface. The light output surface is adjacent and perpendicular to the light incident surface.

6 Claims, 5 Drawing Sheets

BACKLIGHT MODULE

BACKGROUND

1. Technical Field

The present disclosure relates to a backlight module. More particularly, the present disclosure relates to a light-emitting diodes (LED) backlight module that can reduce dark stripes (or hot spot mura).

2. Description of Related Art

A backlight module is a fundamental part in a liquid crystal display (LCD). Since liquid crystal does not emit light itself, the backlight module is needed for providing the required light source. The principle for operating a backlight module is to direct the light emitted from a backlight source as a planar light source via a light guide plate, thereby assuring uniform brightness. LEDs are extensively used as a backlight source in the backlight module in virtue of high brightness, low work voltage, low power consumption, a long lifetime and so on. However, the LEDs are point light sources, and dark stripes would appear between two adjacent LEDs, due to a distance therebetween, thus affecting the uniform brightness.

Therefore, a new type of backlight module is desired to overcome the above described shortcoming.

DETAILED DESCRIPTION

Figure 1:
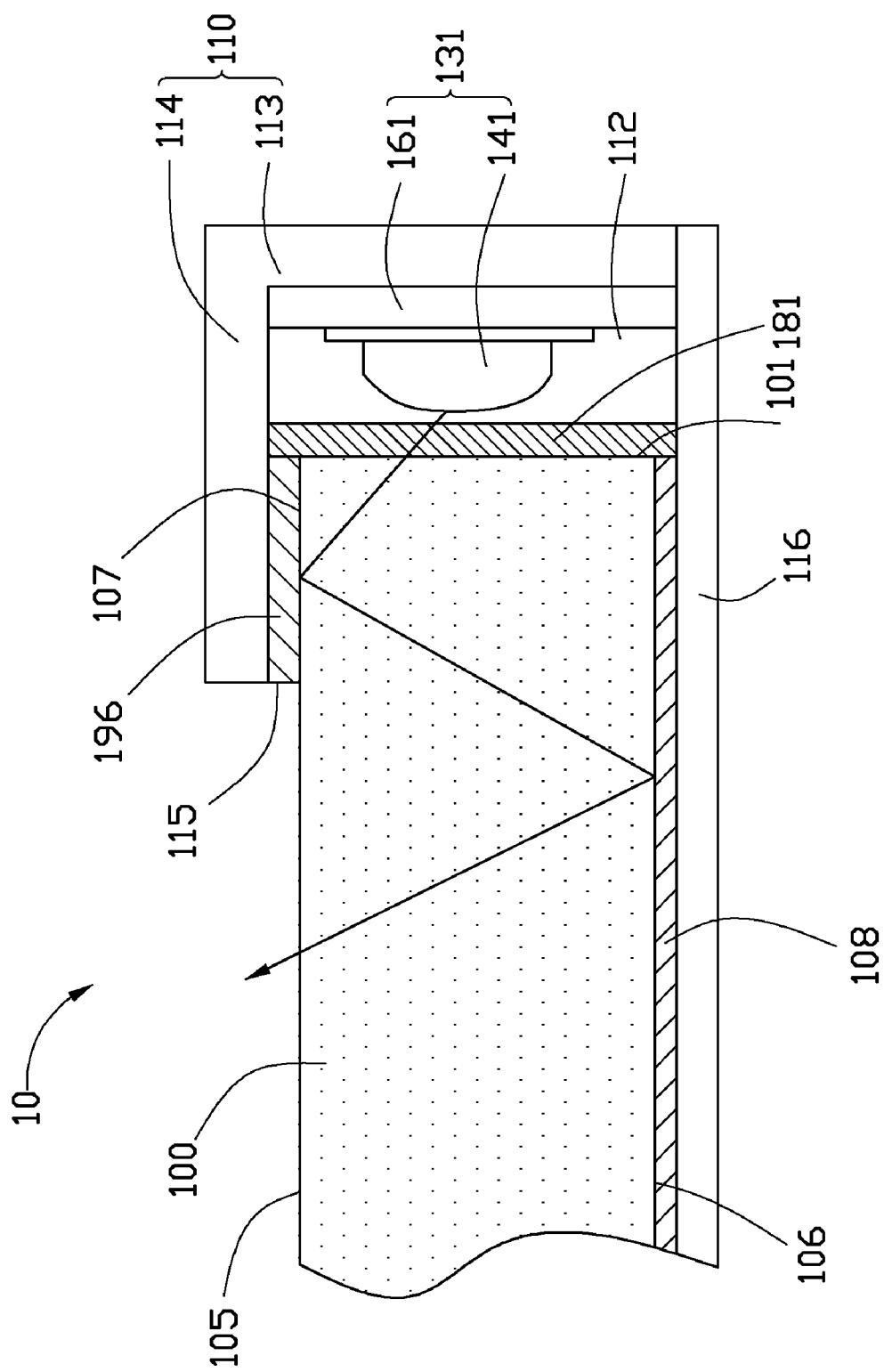
FIG. 1 is a partially cross-sectional view of a backlight module in accordance with a first embodiment.
Figure 2:
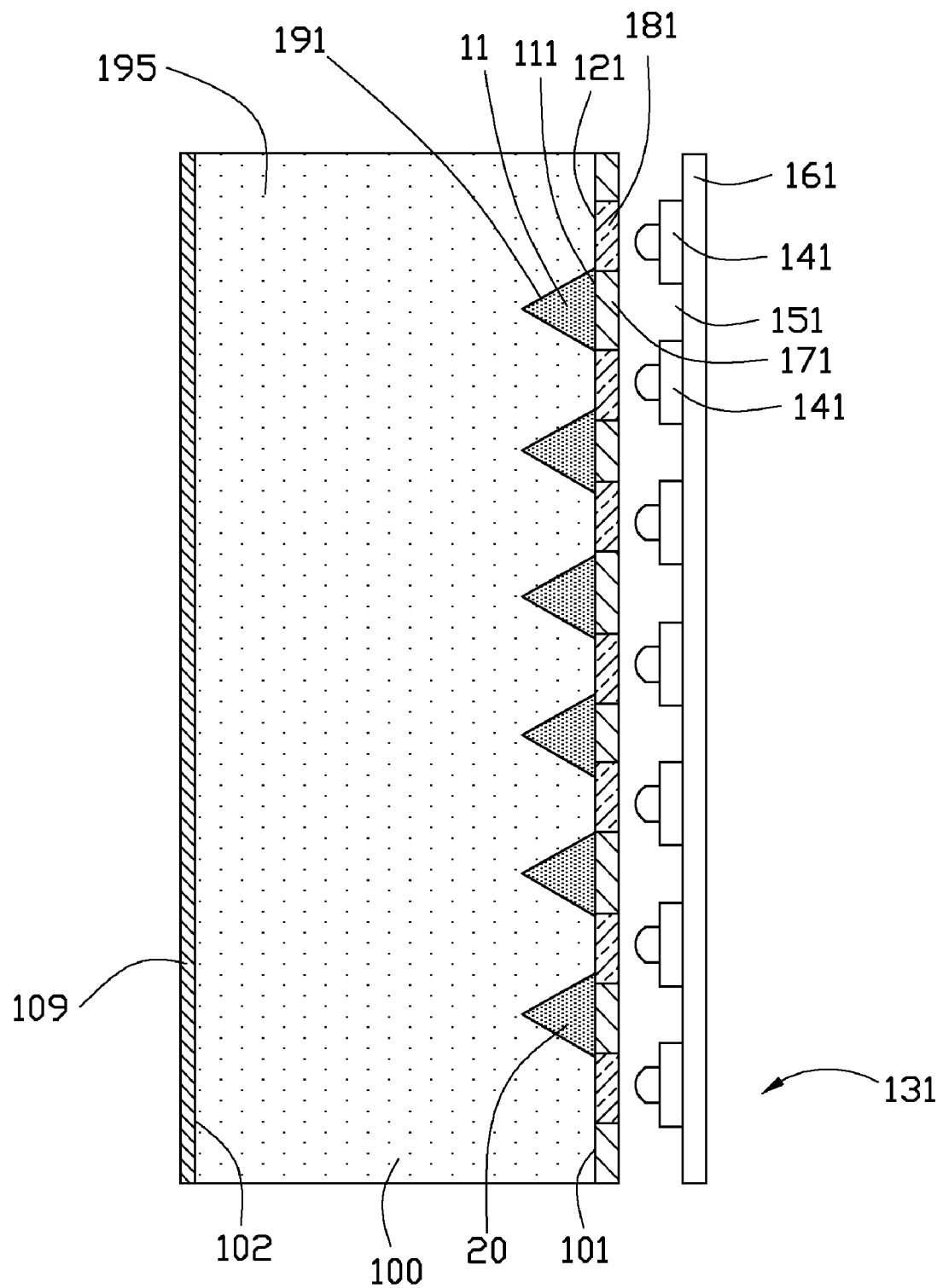
FIG. 2 is a cross-sectional view of the backlight module of FIG. 1, with a base plate and a frame thereof being omitted.

FIGS. 1-2 show a backlight module 10 in accordance with the first embodiment of the present disclosure. The backlight module 10 includes a base plate 116, a frame 110, a light-emitting module 131 and a light guide plate 100. The base plate 116 is located on a bottom of the backlight module 10 and extends along a horizontal direction. The frame 110 is L-shaped in profile and includes a first plate 113 and a second plate 114. The first plate 113 extends perpendicularly from an end of the base plate 116. The second plate 114 is parallel to the base plate 116 and extends horizontally from a top of the first plate 113. The base plate 116 and the frame 110 cooperatively define a receiving chamber 112 having an opening 115 opposite to the first plate 113. The light-emitting module 131 is mounted on the first plate 113 and faces the opening 115 of the receiving chamber 112. One end of the light guide plate 100 is inserted into the receiving chamber 112 and disposed between the second plate 114 of the frame 110 and the base plate 116.

The light guide plate 100 includes a bottom surface 106, a light output surface 105, a light incident surface 101 and an edge surface 102. The bottom surface 106 is mounted on the base plate 116. The light output surface 105 is located at a top side of the light guide plate 100 and opposite to the bottom surface 106. The light output surface 105 has a mounting area 107 for fixing the light output surface 105 onto the second plate 114 of the frame 110. A reflector 196 is attached onto the mounting area 107 of the light output surface 105 and disposed between the mounting area 107 and the second plate 114 of the frame 110. The light incident surface 101 is located at a right side of the light guide plate 100 and interconnects the light output surface 105 and the bottom surface 106. The light incident surface 101 is perpendicular to the light output surface 105. The mounting area 107 of the light output surface 105 is adjacent and connected to the light incident surface 101.

The light-emitting module 131 is adjacent to the light guide plate 100 and faces the light incident surface 101. The light-emitting module 131 includes a plurality of light sources 141 and a PCB (printed circuit board) 161. The PCB 161 is mounted on the first plate 113 of the frame 110. The plurality of light sources 141 is mounted on the PCB 161. The plurality of light sources 141 is arranged in a line along a direction parallel to the light incident surface 101 and spaced from each other. Two adjacent light sources 141 define a space 151 therebetween.

Light emitting from the plurality of light sources 141 entries into the light guide plate 100 through the light incident surface 101. The plurality of light sources 141 each is a point light source 141, for example a light-emitting diode (LED), and thus the light incident surface 101 has a plurality of dark areas 111 corresponding to the plurality of spaces 151 and a plurality of bright areas 121 corresponding to the plurality of light sources 141. The plurality of dark areas 111 and the plurality of bright areas 121 are alternately arranged in a line along the direction parallel to the light incident surface 101. The plurality of bright areas 121 each faces a corresponding light source 141, and the plurality of dark areas 111 each faces a corresponding space 151.

The light guide plate 100 has a plurality of dark regions 11 therein corresponding to the plurality of dark areas 111 of the light incident surface 101. The plurality of dark regions 11 each is adjacent to a corresponding dark area 111 of the light incident surface 101. A plurality of micro-structures 191 is formed in each of the dark regions 11 of the light guide plate 100. A plurality of other micro-structures 195 is formed in the light guide plate 100 except the plurality of dark regions 11. The plurality of micro-structures 191 in each dark region 111 has a greater density than the plurality of other micro-structures 195 in the light guide plate 100 whereby the plurality of micro-structures 191 is capable of diffusing the light travelling through the dark regions 11 of the light guide plate 100 more evenly.

A plurality of reflectors 171 is disposed on the plurality of dark areas 111 of the light incident surface 101. A plurality of diffusers 181 is disposed on the plurality of bright areas 121 of the light incident surface 101. The plurality of reflectors 171 and the plurality of diffusers 181 are alternately arranged on the light incident surface 101. A reflecting film 108 is disposed between the bottom surface 106 of the light guide plate 100 and the base plate 116. The reflecting film 108 and the plurality of reflectors 171 are integrally formed. A reflecting layer 109 is disposed on the edge surface 102 of the light guide plate 100.

In operation, light emitting from the light sources 141 enters into the light guide plate 100 through the plurality of diffusers 181 on the light incident surface 101. A part of the light is reflected by the reflecting layer 109 and redirected toward the dark area 111 of the light incident surface 101. The part of light is reflected by the reflector 171 and continues their ways out of the light guide plate 100 via the light output surface 105. Thus, the plurality of dark areas 111 are illuminated and reduced whereby uniform light eventually emits out of the light output surface 105 of the light guide plate 100.

Figure 3:
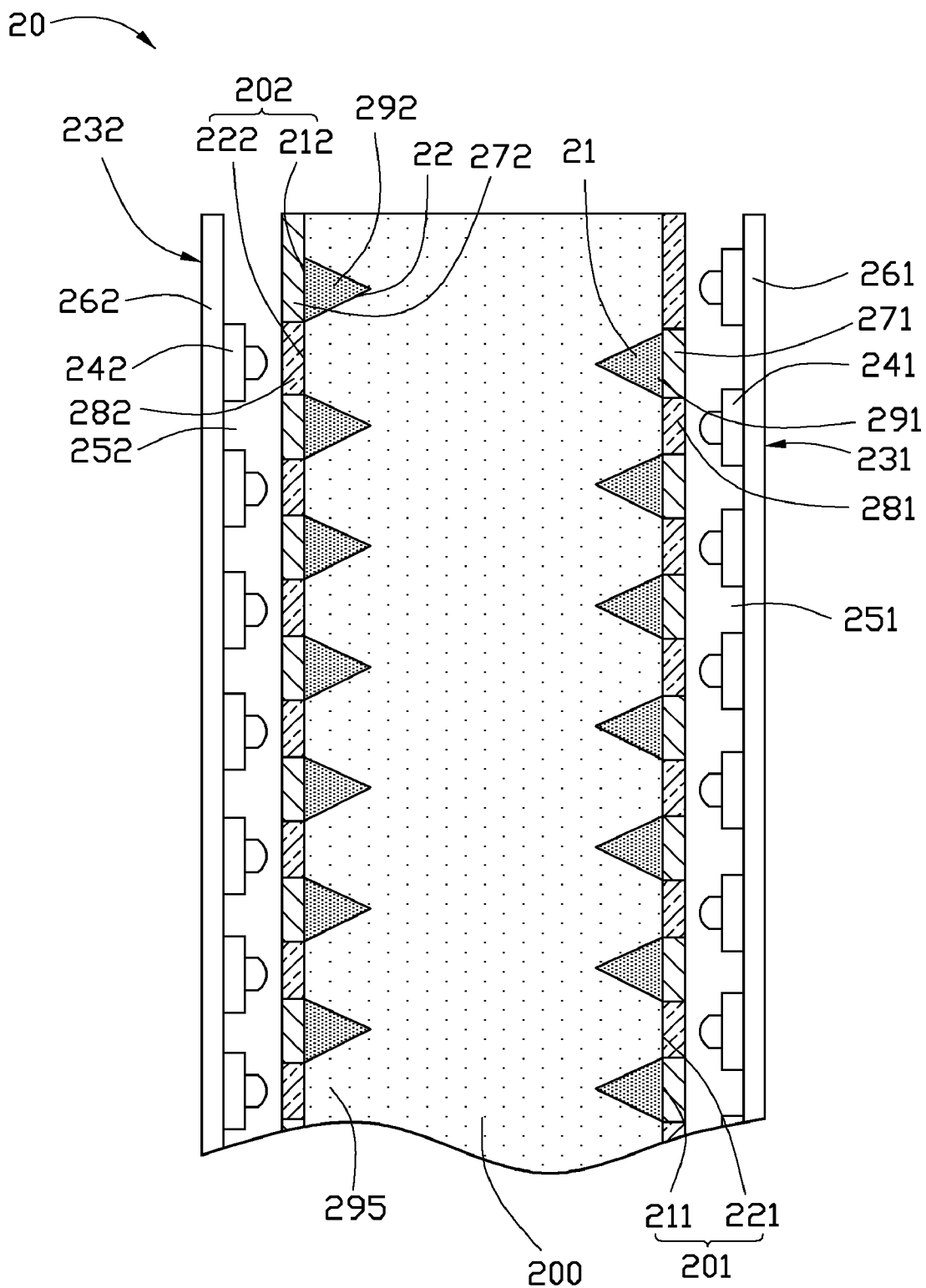
FIG. 3 is a partially cross-sectional view of a backlight module in accordance with a second embodiment.
Figure 4:
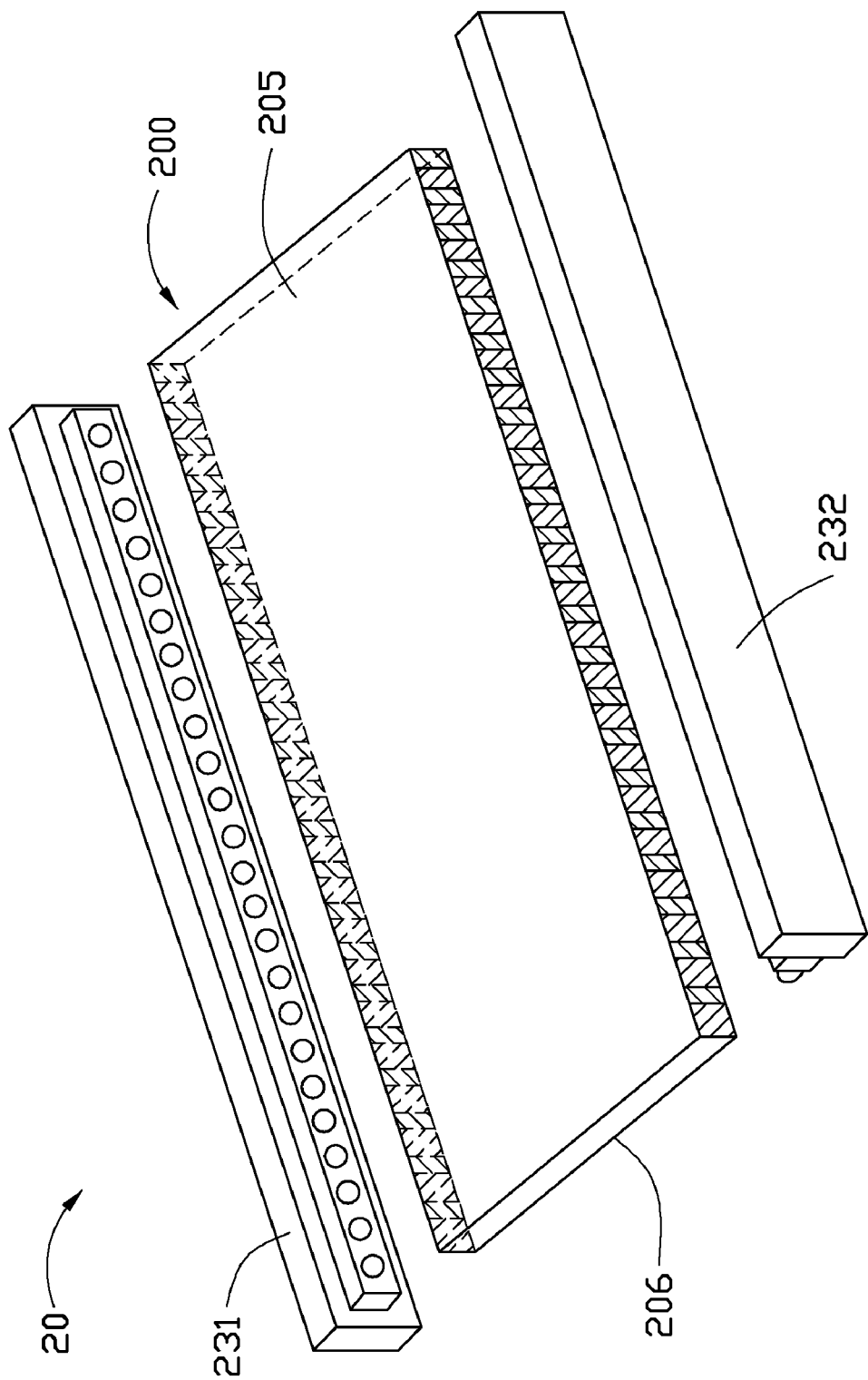
FIG. 4 is a schematic view of the backlight module of FIG. 3.

FIGS. 3-4 show a backlight module 20 according to a second embodiment. The backlight module 20 includes a first light-emitting module 231, a second light-emitting module 232 and a light guide plate 200. The light guide plate 200 includes a bottom surface 206, a light output surface 205, a first light incident surface 201 and a second light incident surface 202. The light output surface 205 is located at a top side of the light guide plate 200 and opposite to the bottom surface 206. The first light incident surface 201 is located at a right side of the light guide plate 200. The second light incident surface 202 is located at a left side of the light guide plate 200 and opposite to the first light incident surface 201. The first light incident surface 201 and the second light incident surface 202 interconnect with the light output surface 205 and the bottom surface 206. The first light incident surface 201 and the second light incident surface 202 are perpendicular and adjacent to the light output surface 205.

The first light-emitting module 231 is disposed at a right side of the light guide plate 200 and faces the first light incident surface 201. The first light-emitting module 231 includes a plurality of first light sources 241 and a first PCB 261. The plurality of first light sources 241 is mounted on the first PCB 261. The plurality of first light sources 241 is arranged in a line along a direction parallel to the first light incident surface 201 and spaced from each other. Two adjacent first light sources 241 define a first space 251 therebetween.

The second light-emitting module 232 is disposed at a left side of the light guide plate 200 and faces the second light incident surface 202. The second light-emitting module 232 includes a plurality of second light sources 242 and a second PCB 262. The plurality of second light sources 242 is mounted on the second PCB 262. The plurality of second light sources 242 is arranged in a line along a direction parallel to the second light incident surface 202 and spaced from each other. Two adjacent second light sources 242 define a second space 252 therebetween. The plurality of first light sources 241 and the plurality of second light sources 242 are interlaced along the direction parallel to the first light incident surface 201. In other words, each of the plurality of second light sources 242 is located between two adjacent first light sources 241 along a lengthwise direction of the PCB 261 or the PCB 262.

The plurality of first light sources 241 each is a point source, for example a light-emitting diode (LED). Thus the first light incident surface 201 has a plurality of first dark areas 211 corresponding to the plurality of first spaces 251 and a plurality of first bright areas 221 corresponding to the plurality of first light sources 241. The plurality of first dark areas 211 and the plurality of first bright areas 221 are alternately arranged in a line. The plurality of first bright areas 221 each faces a corresponding first light source 241, and the plurality of first dark areas 211 each faces a corresponding first space 251. The light guide plate 200 has a plurality of first dark regions 21 therein corresponding to the plurality of first dark areas 211 of the first light incident surface 201. The plurality of first dark regions 21 each is adjacent to a corresponding first dark area 211 of the first light incident surface 201.

A plurality of first reflectors 271 is disposed on the plurality of first dark areas 211 of the first light incident surface 201. A plurality of first diffusers 281 is disposed on the plurality of first bright areas 221 of the first light incident surface 201. Thus, the plurality of first reflectors 271 and the plurality of first diffusers 281 are alternately arranged in a line on the first light incident surface 201.

The plurality of second light sources 242 each is a point light source, for example a light-emitting diode (LED). Thus the second light incident surface 202 has a plurality of second dark areas 212 corresponding to the plurality of second spaces 252 and a plurality of second bright areas 222 corresponding to the plurality of second light sources 242. The plurality of second dark areas 212 and the plurality of second bright areas 222 are alternately arranged in a line. The plurality of second bright areas 222 each faces a corresponding second light source 242, and the plurality of second dark areas 212 each faces a corresponding second space 252. The light guide plate 200 has a plurality of second dark regions 22 therein corresponding to the plurality of second dark areas 212 of the second light incident surface 202. The plurality of second dark regions 22 each is adjacent to a corresponding second dark area 212 of the second light incident surface 202.

A plurality of second reflectors 272 is disposed on the plurality of second dark areas 212 of the second light incident surface 202. A plurality of second diffusers 282 is disposed on the plurality of second bright areas 222 of the second light incident surface 202. Thus, the plurality of second reflectors 272 and the plurality of second diffusers 282 are alternately arranged in a line on the second light incident surface 202.

A plurality of first micro-structures 291 is formed in each of the first dark regions 21 of the light guide plate 200. A plurality of second micro-structures 292 is formed in each of the second dark regions 22 of the light guide plate 200. The plurality of first and second micro-structures 291, 292 are interlaced along the direction parallel to the first light incident surface 201. A plurality of other micro-structures 295 is formed in the light guide plate 200 except the plurality of first and second dark regions 21, 22. The plurality of first and second micro-structures 291, 292 in the first and second dark regions 21, 22 have a greater density than the plurality of other micro-structures 295 in the light guide plate 200.

The plurality of first and second light sources 241, 242 are interlaced along the direction parallel to the first light incident surface 201. The light emitting from the plurality of first light sources 241 travels directly toward the plurality of second dark areas 212 of the second light incident surface 202. The light emitting from the plurality of second light sources 242 travels directly toward the plurality of first dark areas 211 of the first light incident surface 201. Thus, the plurality of first and second dark areas 211, 212 can be further lightened.

Figure 5:
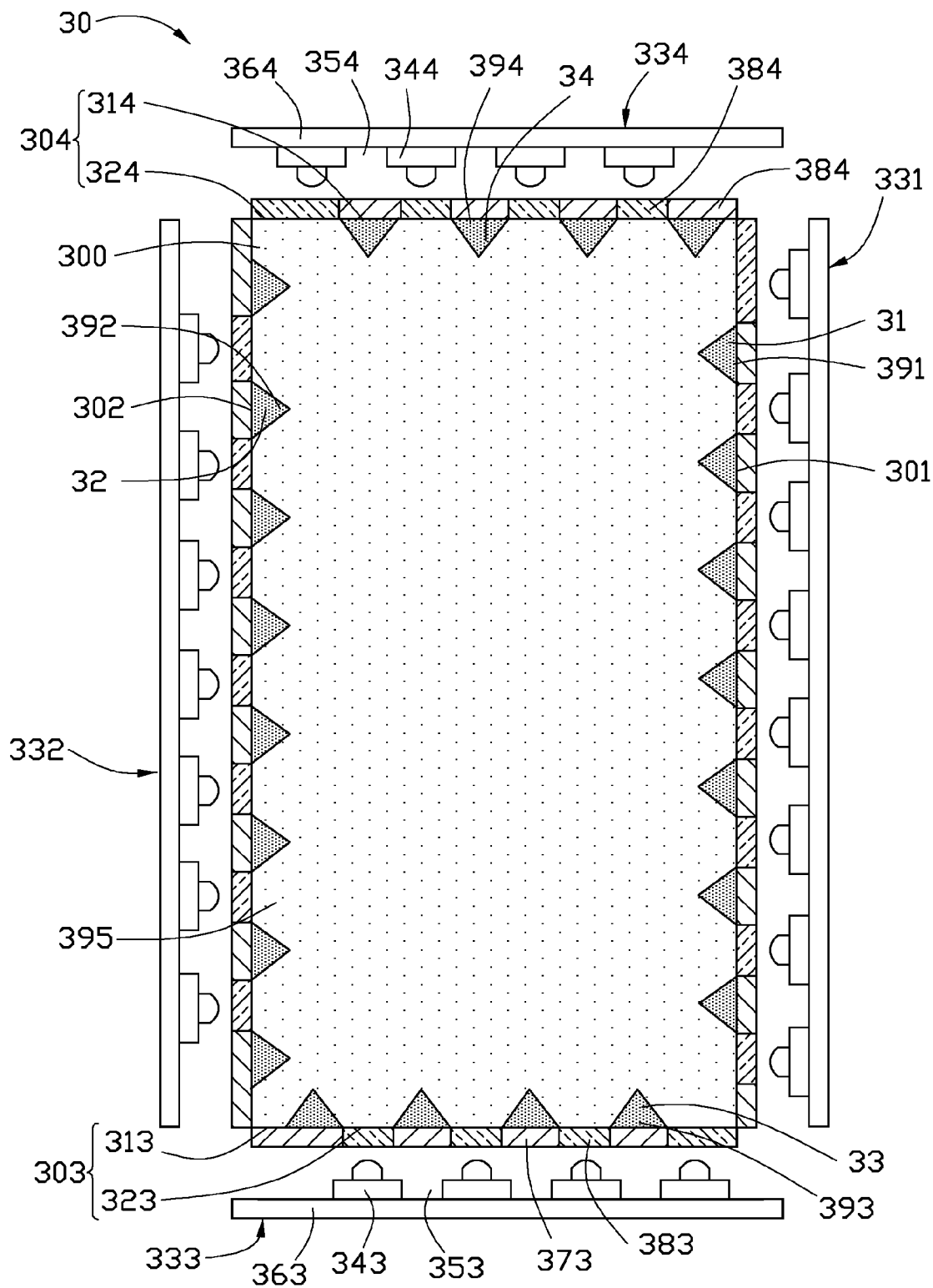
FIG. 5 is a cross-sectional view of a backlight module in accordance with a third embodiment.

FIG. 5 shows a backlight module 30 according to a third embodiment. The backlight module 30 includes a light guide plate 300 and four light-emitting modules, i.e., a first light-emitting module 331, a second light-emitting module 332, a third light-emitting module 333 and a fourth light-emitting module 334. The first and second light-emitting modules 331, 332 of the backlight module 30 in accordance with the third embodiment are substantially the same as the first and second light-emitting modules 231, 232 of the backlight module 20 of the second embodiment.

The light guide plate 300 includes a bottom surface (not shown), a light output surface (not shown), and four light incident surfaces, i.e., a first light incident surface 301, a second light incident surface 302, a third light incident surface 303 and a fourth light incident surface 304. The bottom surface, the light output surface, the first and second light incident surfaces 301, 302 of the backlight module 30 in accordance with the third embodiment are substantially the same as those of the backlight module 20 of the second embodiment.

The third light incident surface 303 is located at a front side of the light guide plate 300. The fourth light incident surface 304 is located at a rear side of the light guide plate 300 and opposite to the third light incident surface 303. The third and fourth light incident surfaces 303, 304 interconnect with the light output surface and the bottom surface. The third and fourth four light incident surfaces 303, 304 are perpendicular and adjacent to the light output surface.

The third light-emitting module 333 is disposed at a front side of the light guide plate 300 and faces the third light incident surface 303. The third light-emitting module 333 includes a plurality of third light sources 343 and a third PCB 363. The plurality of third light sources 343 is mounted on the third PCB 363. The plurality of third light sources 343 is arranged in a line along a direction parallel to the third light incident surface 303 and spaced from each other. Two adjacent third light sources 343 define a third space 353 therebetween.

The fourth light-emitting module 334 is disposed at a rear side of the light guide plate 300 and faces the fourth light incident surface 304. The fourth light-emitting module 334 includes a plurality of fourth light sources 344 and a fourth PCB 364. The plurality of fourth light sources 344 is mounted on the fourth PCB 364. The plurality of fourth light sources 344 is arranged in a line along a direction parallel to the fourth light incident surface 304 and spaced from each other. Two adjacent fourth light sources 344 define a fourth space 354 therebetween. The plurality of third light sources 343 and the plurality of fourth light sources 344 are interlaced along the direction parallel to the third light incident surface 303. In other words, the plurality of fourth light sources 344 each is located between two adjacent third light sources 343.

The plurality of third light sources 343 each is a point light source, for example a light-emitting diode (LED). Thus the third light incident surface 303 has a plurality of third dark areas 313 corresponding to the plurality of third spaces 353 and a plurality of third bright areas 323 corresponding to the plurality of third light sources 343. The plurality of third dark areas 313 and the plurality of third bright areas 323 are alternately arranged in a line on the third light incident surface 303. The plurality of third bright areas 323 each faces a corresponding third light source 343, and the plurality of third dark areas 313 each faces a corresponding third space 353. The light guide plate 300 has a plurality of third dark regions 33 therein corresponding to the plurality of third dark areas 313 of the third light incident surface 303. The plurality of third dark regions 33 each is adjacent to a corresponding third dark area 313 of the third light incident surface 303.

A plurality of third reflectors 373 is disposed on the plurality of third dark areas 313 of the third light incident surface 303. A plurality of third diffusers 383 is disposed on the plurality of third bright areas 323 of the third light incident surface 303. Thus, the plurality of third reflectors 373 and the plurality of third diffusers 383 are alternately arranged in a line on the third light incident surface 303.

The plurality of fourth light sources 344 each is a point light source, for example a light-emitting diode (LED). Thus the fourth light incident surface 304 has a plurality of fourth dark areas 314 corresponding to the plurality of fourth spaces 354 and a plurality of fourth bright areas 324 corresponding to the plurality of fourth light sources 344. The plurality of fourth dark areas 314 and the plurality of fourth bright areas 324 are alternately arranged in a line. The plurality of fourth bright areas 324 each faces a corresponding fourth light source 344, and the plurality of fourth dark areas 314 each faces a corresponding fourth space 354. The light guide plate 300 has a plurality of fourth dark regions 34 therein corresponding to the plurality of fourth dark areas 314 of the fourth light incident surface 304. The plurality of fourth dark regions 34 each is adjacent to a corresponding fourth dark area 314 of the fourth light incident surface 304.

A plurality of fourth reflectors 374 is disposed on the plurality of fourth dark areas 314 of the fourth light incident surface 304. A plurality of fourth diffusers 384 is disposed on the plurality of fourth bright areas 324 of the fourth light incident surface 304. Thus, the plurality of fourth reflectors 374 and the plurality of fourth diffusers 384 are alternately arranged in a line on the fourth light incident surface 304.

A plurality of first, second, third and fourth micro-structures 391, 392, 393, 394 is formed in the light guide plate 300. The first and second micro-structures 391, 392 of the backlight module 30 in accordance with the third embodiment are substantially the same as those of the backlight module 20 of the second embodiment.

The plurality of third micro-structures 393 is formed in each of the third dark regions 33 of the light guide plate 300. The plurality of fourth micro-structures 394 is formed in each of the fourth dark regions 34 of the light guide plate 300. The third and fourth dark regions 33, 34 are interlaced along the direction parallel to the third light incident surface 303. A plurality of other micro-structures 395 is formed in the light guide plate 300 except the plurality of first, second, third and fourth dark regions 31, 32, 33, 34. The plurality of first, second, third and fourth micro-structures 391, 392, 393, 394 have a greater density than the plurality of other micro-structures 395.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
    a plurality of first light sources being arranged in a line and spaced from each other, two adjacent first light sources defining a first space therebetween, the plurality of first light sources emitting first light; and
    a light guide plate comprising:
        a first light incident surface for receiving the first light from the plurality of first light sources, the first light incident surface having a plurality of bright areas respectively corresponding to the first light sources and a plurality of dark areas respectively corresponding to the first spaces, a plurality of first reflectors being disposed on the plurality of dark areas of the first incident surface; and
        a light output surface being adjacent and perpendicular to the light incident surface;
    wherein the light guide plate has a plurality of first dark regions therein, and a plurality of first micro-structures is formed in each of the plurality of first dark regions of the light guide plate; and
    wherein a plurality of other micro-structures is formed in the light guide plate except the plurality of first dark regions thereof, and the plurality of first micro-structures has a greater density than the plurality of other micro-structures.

2. The backlight module of claim 1 further comprising a plurality of first diffusers, wherein the plurality of first diffusers is disposed on the plurality of first bright areas of the first incident surface.

3. The backlight module of claim 1 further comprising a reflecting layer, wherein the light guide plate further comprises an edge surface opposite to the first incident surface, the reflecting layer being disposed on the edge surface of the light guide plate.

4. The backlight module of claim 1 further comprising another reflector, wherein the light output surface has a mounting area adjacent and connected to the first light incident surface, the another reflector being disposed on the mounting area of the light output surface.

5. The backlight module of claim 1 further comprising a reflecting film, wherein the light guide plate further comprises a bottom surface opposite to the light output surface, the reflecting film being disposed on the bottom surface of the light guide plate.

6. The backlight module of claim 1, wherein the plurality of first dark regions is adjacent to the plurality of dark areas of the first light incident surface.

* * * * *